US010723286B2

(12) United States Patent
Cifra et al.

(10) Patent No.: US 10,723,286 B2
(45) Date of Patent: Jul. 28, 2020

(54) SEPARATOR FOR A MOTOR VEHICLE

(71) Applicant: Honda Motor Co., Ltd., Tokyo (JP)

(72) Inventors: Irene A. Cifra, Columbus, OH (US); Nick A. Massaro, Dublin, OH (US); Aron K. Madsen, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 608 days.

(21) Appl. No.: 15/357,451

(22) Filed: Nov. 21, 2016

(65) Prior Publication Data

US 2018/0141503 A1    May 24, 2018

(51) Int. Cl.
| | | |
|---|---|---|
| B60R 13/08 | (2006.01) | |
| B32B 3/06 | (2006.01) | |
| B32B 3/08 | (2006.01) | |
| B32B 3/26 | (2006.01) | |
| B32B 5/20 | (2006.01) | |
| B32B 27/34 | (2006.01) | |
| F16J 15/02 | (2006.01) | |

(52) U.S. Cl.
CPC ............. *B60R 13/08* (2013.01); *B32B 3/06* (2013.01); *B32B 3/08* (2013.01); *B32B 3/266* (2013.01); *B32B 5/20* (2013.01); *B32B 27/34* (2013.01); *F16J 15/02* (2013.01); *B32B 2250/02* (2013.01); *B32B 2250/24* (2013.01); *B32B 2307/31* (2013.01); *B32B 2605/08* (2013.01)

(58) Field of Classification Search
CPC ...... B62D 65/02; B62D 29/002; B21D 53/88; Y10T 29/49622; Y10T 156/1003; Y10T 156/1028; Y10T 29/18; Y10T 29/185; Y10T 29/496; Y10T 29/49616; Y10T 29/53
See application file for complete search history.

(56) References Cited

U.S. PATENT DOCUMENTS

| | | | |
|---|---|---|---|
| 5,806,915 A | 9/1998 | Takabatake | |
| 7,097,794 B2 | 8/2006 | McLeod et al. | |
| 7,406,849 B2 * | 8/2008 | Ueno | B21D 26/021 |
| | | | 228/112.1 |
| 7,428,774 B2 | 9/2008 | Thomas et al. | |
| 7,838,100 B2 | 11/2010 | McLeod et al. | |

(Continued)

FOREIGN PATENT DOCUMENTS

| | | |
|---|---|---|
| GB | 2301321 A | 12/1996 |
| WO | WO2008065049 A1 | 6/2008 |

*Primary Examiner* — Rick K Chang
(74) *Attorney, Agent, or Firm* — Honda Patents & Technologies North America, LLC; Mark E. Duell

(57) ABSTRACT

A separator for sealing a cavity in a motor vehicle includes a first separator part for sealing a portion of the cavity that includes a first expandable layer located around an outer edge and a second separator part for sealing a second portion of the cavity that includes a second expandable layer. The first separator part abuts the second separator part when installed in the cavity of the motor vehicle. The first expandable layer and second expandable layer expand to provide a seal around the first separator part and second separator part when heated. The separator further includes a third separator part for sealing a third portion of the cavity that includes an expandable tape that adheres to a surface of the third portion of the cavity. The expandable tape expands to seal the third portion of the cavity when heated.

18 Claims, 7 Drawing Sheets

SECTION A-A

(56) References Cited

U.S. PATENT DOCUMENTS

| | | |
|---|---|---|
| 7,841,647 B2 | 11/2010 | Niezur et al. |
| 8,293,360 B2 | 10/2012 | Cousin et al. |
| 8,366,181 B2 | 2/2013 | Belpaire et al. |
| 8,381,403 B2 | 2/2013 | Lewis |
| 2004/0090017 A1 | 5/2004 | Roberts et al. |
| 2006/0043772 A1* | 3/2006 | Richardson .......... B62D 29/002 296/187.02 |

* cited by examiner

SECTION A-A

SEPARATOR FOR A MOTOR VEHICLE

TECHNICAL FIELD

The embodiments herein are directed to a separator for cavities in a motor vehicle body.

BACKGROUND

Bodies for motor vehicles are a combination of assembled parts, including parts that make the frame, interior linings, and external sheet metal that make the exterior of the motor vehicle. Cavities or openings may be formed by these parts, which may create pathways for the introduction of noise or pollution into the cabin of the vehicle. Often there is a need to introduce separators or baffles to close these pathways. However, the geometry of the cavities may make the installation of a separator or baffle difficult or impossible. Therefore, an improved separator and method of installing the separator is necessary.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a separator for sealing a cavity in a motor vehicle includes a first separator part for sealing a first portion of the cavity that includes a first expandable layer located around an outer edge of the first separator part; and a second separator part for sealing a second portion of the cavity that includes a second expandable layer located around an outer edge of the second separator part. The first separator part abuts the second separator part when installed in the cavity of the motor vehicle. The first expandable layer and second expandable layer expand to provide a seal around the first separator part and second separator part when heated.

According to another aspect, the separator further includes a third separator part for sealing a third portion of the cavity that includes an expandable tape that adheres to a surface of the third portion of the cavity. The expandable tape expands to seal the third portion of the cavity when heated.

According to yet another aspect, a system for sealing a cavity in a motor vehicle, the cavity being formed by at least a first body part and a second body part, includes a separator. The separator includes a first separator part attached to the first body part for sealing a first portion of the cavity, which includes a first expandable layer located around an outer edge of the first separator part. The separator also includes a second separator part attached to the second body part of the motor vehicle for sealing a second portion of the cavity, which includes a second expandable layer located around an outer edge of the second separator part. The first separator part abuts the second separator part when installed in the cavity of the motor vehicle, and the first expandable layer and second expandable layer expand to provide a seal around the first separator part and second separator part when heated to seal the cavity.

According to still yet another aspect, a method of assembling a portion of a motor vehicle, includes the steps of assembling a first body part of the motor vehicle, a first separator part being attached to the first body part by a first clip integrally formed with the first separator part, the first separator part comprising a first expandable layer located around an outer edge of the first separator part, the first body part defining a first portion of a cavity, assembling a second body part of the motor vehicle, a second separator part being attached to the second body part by a second clip integrally formed with the second separator part, the second separator part comprising a second expandable layer located around an outer edge of the second separator part, the second body part defining a second portion of the cavity, and heating the motor vehicle. The first expandable layer and second expandable layer expand to provide a seal around the first separator part and second separator part when heated, thereby sealing the cavity.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
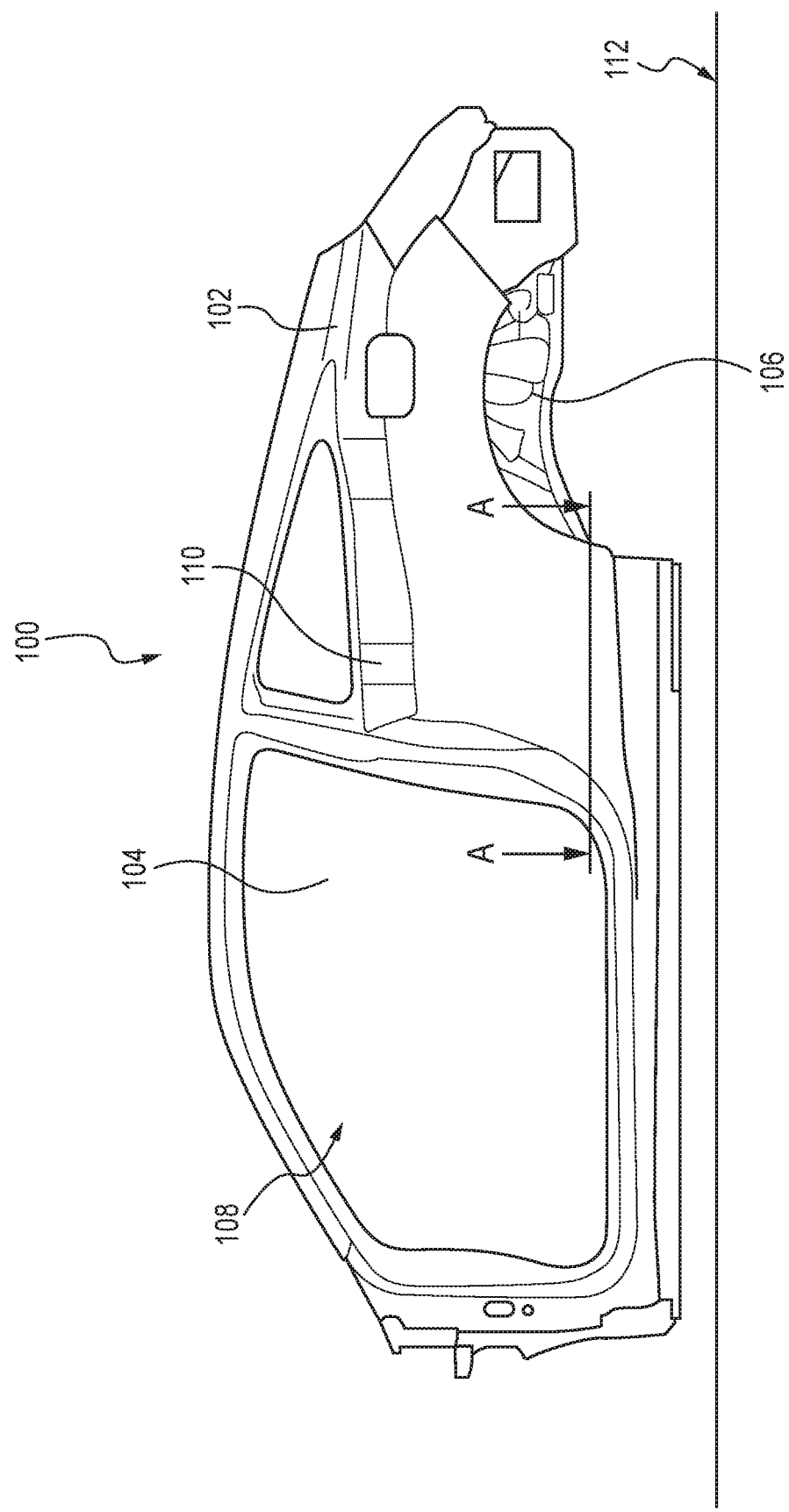
FIG. 1 is a side view of a portion of a body of a motor vehicle.
Figure 2:
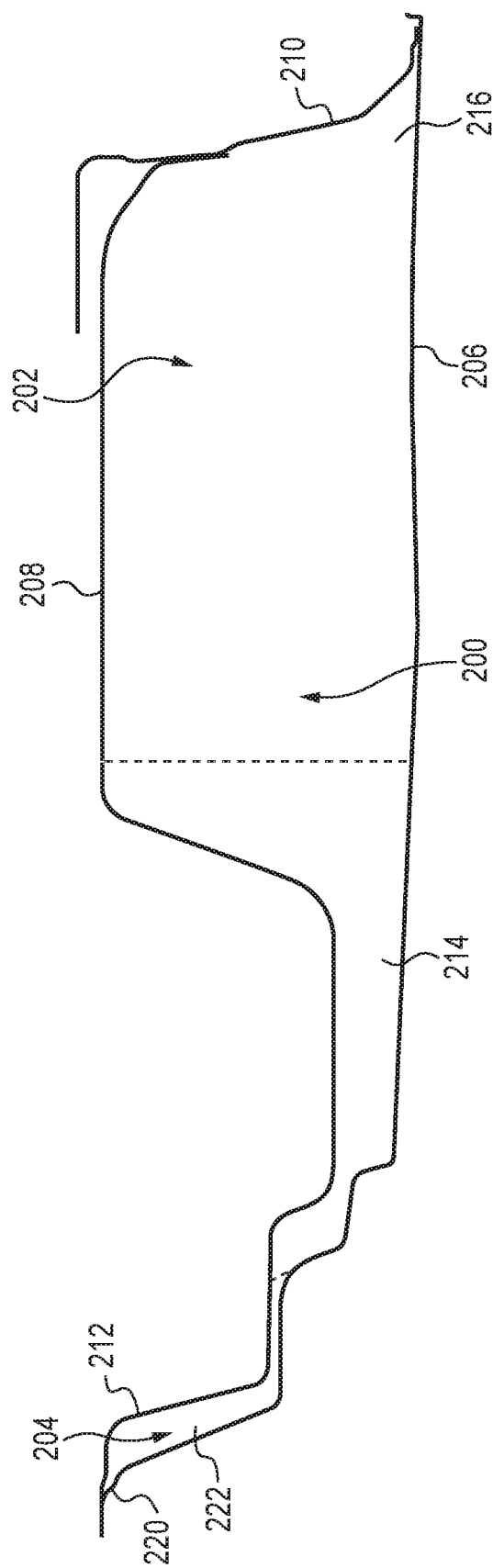
FIG. 2 is a cross-section along line A-A of FIG. 1 illustrating a cavity in the body of the motor vehicle.

FIG. 1 illustrates a portion of a body 102 of a motor vehicle 100, featuring a rear quarter of the motor vehicle 100, located longitudinally behind a door opening 104 and in front of a rear wheel well 106. FIG. 2 is a cross-section along line A-A of FIG. 1, and illustrates a cavity 200 that includes a large rear quarter cavity portion 202 and a forward quarter cavity portion 204. The rear quarter cavity portion 202 is formed between an outer side panel 206, which forms a part of the exterior of the motor vehicle 100, a side sill reinforcement 208, and a wheel arch reinforcement extension 210. The forward quarter cavity portion 204 is formed between a pillar stiffener 212 in the body 102 of the motor vehicle 100 and the outer side panel 206. The cavity 200, if not properly sealed, may be a source of detectable noise and vibrations within the passenger cabin 108 of the motor vehicle 100.

Figure 3:
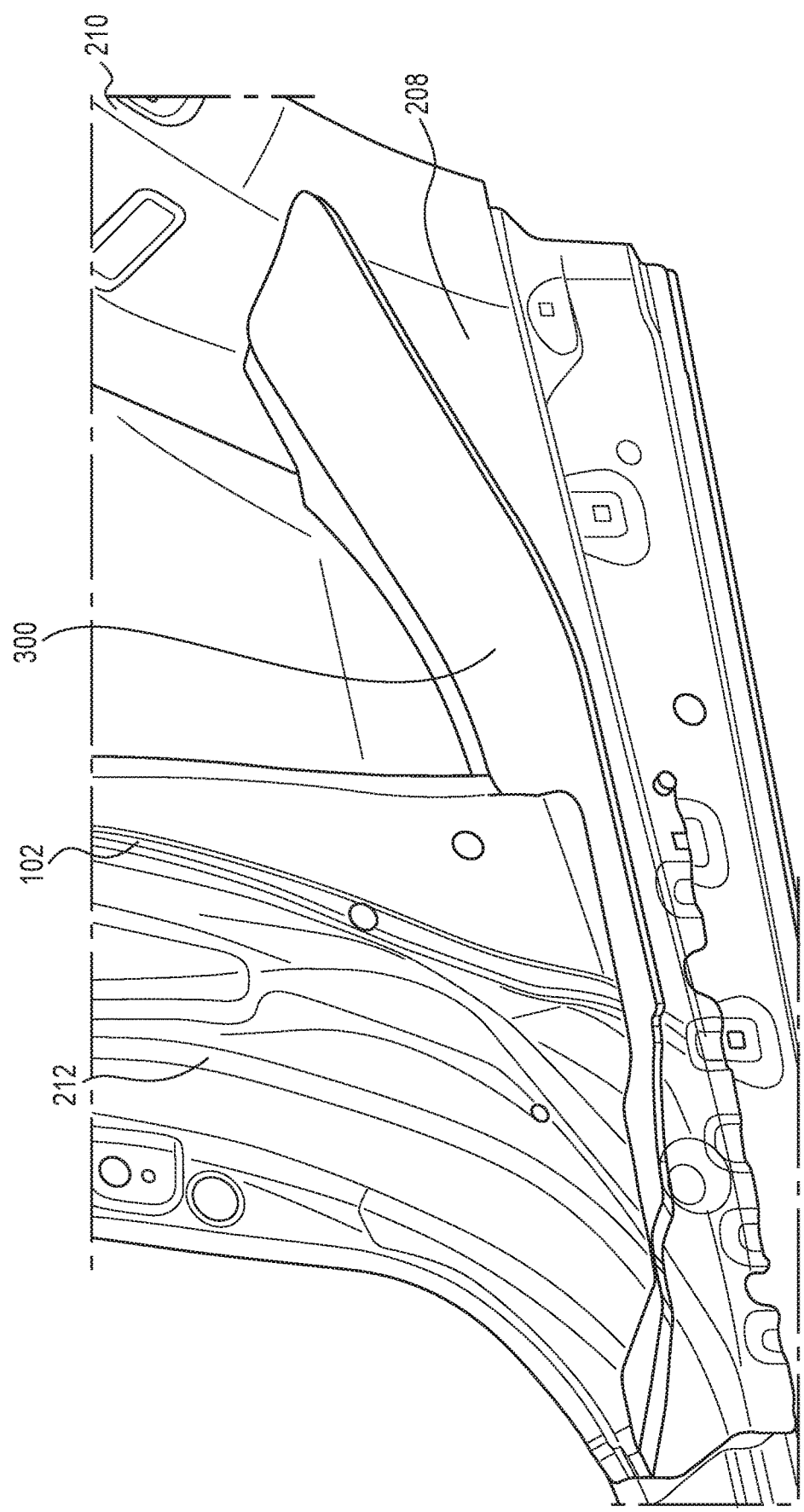
FIG. 3 is a perspective view of a portion of the body of the motor vehicle showing a cavity and a separator package.

In order to adequately seal the cavity 200 to prevent the transmission and resonance of noise and vibrations through the body 102, a separator package 300 is installed. One embodiment of a separator package 300 is illustrated in FIG. 3. As further illustrated in FIG. 4, the separator package 300 may include a first separator 400, a second separator 402, and a third separator 404, which, upon the completion of assembly and the electrophoretic deposition coating (e-coat) and baking process, seals the cavity between the upper portion 110 of the body 102 and the road 112.

The separator package 300 is separated into three parts for at least two reasons. First, the shape of the cavity 200 may be irregular and variable between different models, or even different trim packages of the same motor vehicle 100. This is particularly the case with the forward quarter cavity portion 204. Due to the complexity of shapes of the outer side panel 206, the side sill reinforcement 208, the wheel arch reinforcement extension 210, and the pillar stiffener 212, installation of a single large separator may be ergonomically and/or practically difficult or impossible. Portions of the cavity 200 may be obscured during the assembly process or positioned where an assembly worker cannot reach to install the separator package 300. By installing the separator package 300 in three different separators 400, 402, 404, installation in the irregular-shaped cavity 200 may be better facilitated and can be accomplished at different times during the assembly process.

Secondly, a shape of one of the separators 400, 402, 404 may be exchanged for a different shaped part for a different model of motor vehicle 100 or a different trim package of the same motor vehicle 100, the parts of which may be sourced from different suppliers. Additionally, the complexity of the shapes may effectively prohibit a single molded separator package 300.

Figure 4:
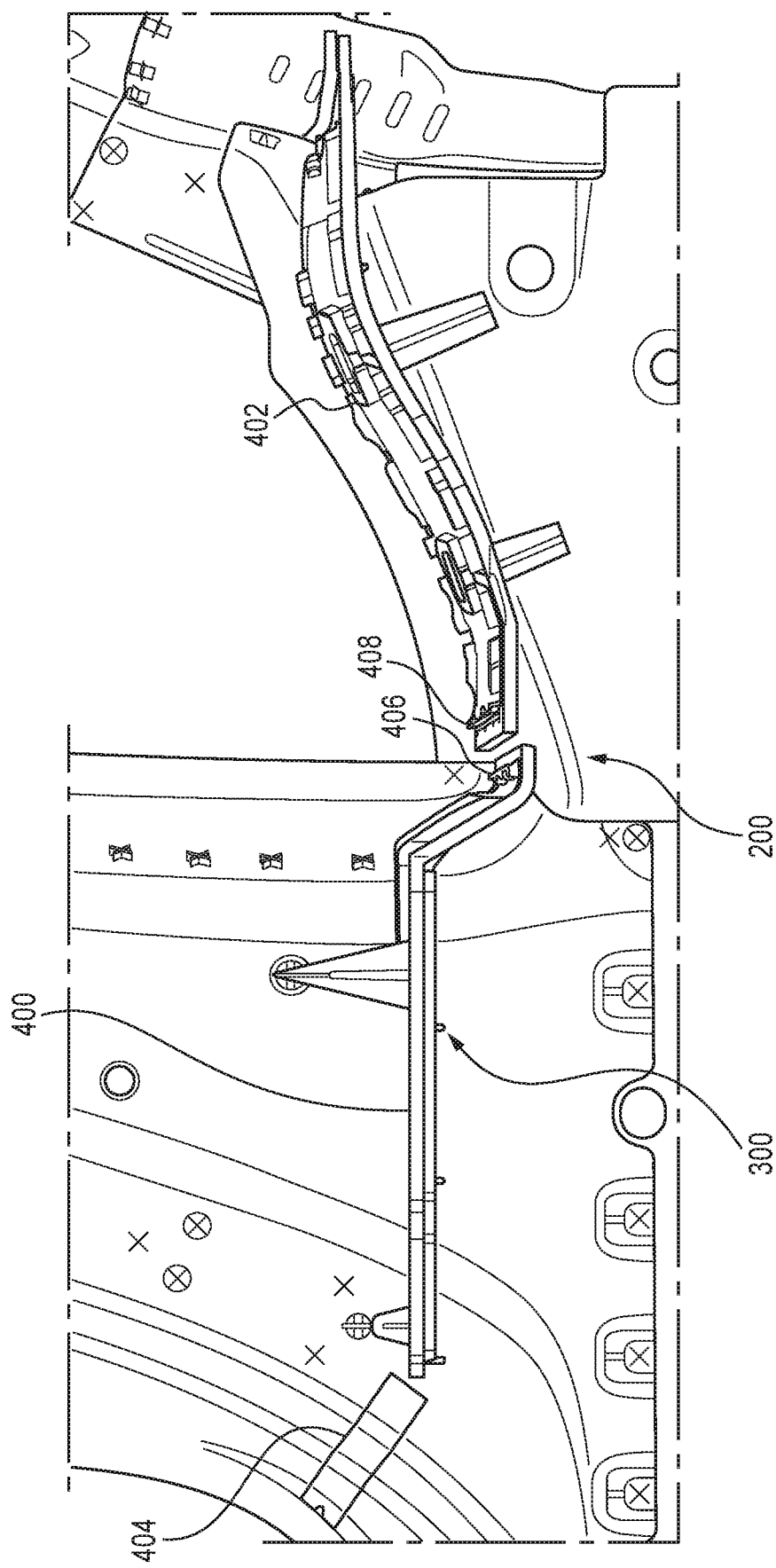
FIG. 4 is a side view of the separator package in an uncured state.

With continuing reference to FIG. 4, the cavity 200 includes a separator package 300 including a first separator 400, a second separator 402, and a third separator 404. As illustrated in FIG. 2, the large rear quarter cavity portion 202 may include a centrally located first portion 214 formed by the pillar stiffener 212 and outer side panel 206. The first portion 214 is sealed by the first separator 400. A longitudinally rearward second portion 216 of the large rear quarter cavity portion 202 is formed by the side sill reinforcement 208, the wheel arch reinforcement extension 210, and the outer side panel 206. The second portion 216 is sealed by the second separator 402. The forward quarter cavity portion 204, which is formed by the pillar stiffener 212 and outer side panel 206 and is longitudinally forward of the rear quarter cavity portion 202, is the narrowest and most geometrically varying portion in the cavity 200. The forward quarter cavity portion 204 is sealed by the third separator 404.

Figure 5:
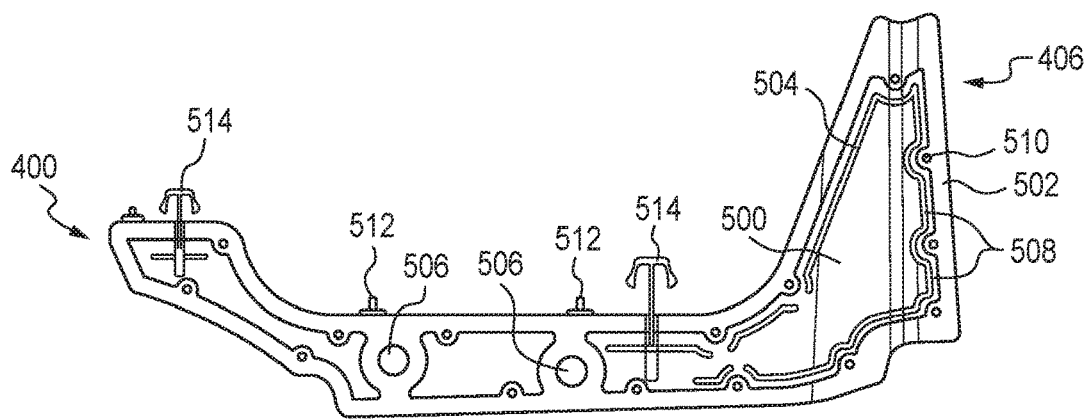
FIG. 5 is a top view of a first separator of the separator package.
Figure 6:
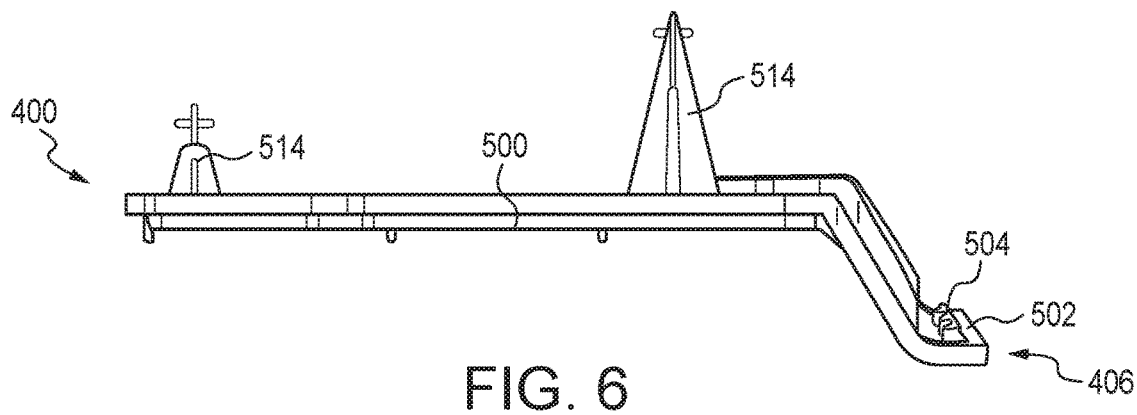
FIG. 6 is a side view of the first separator.
Figure 7:
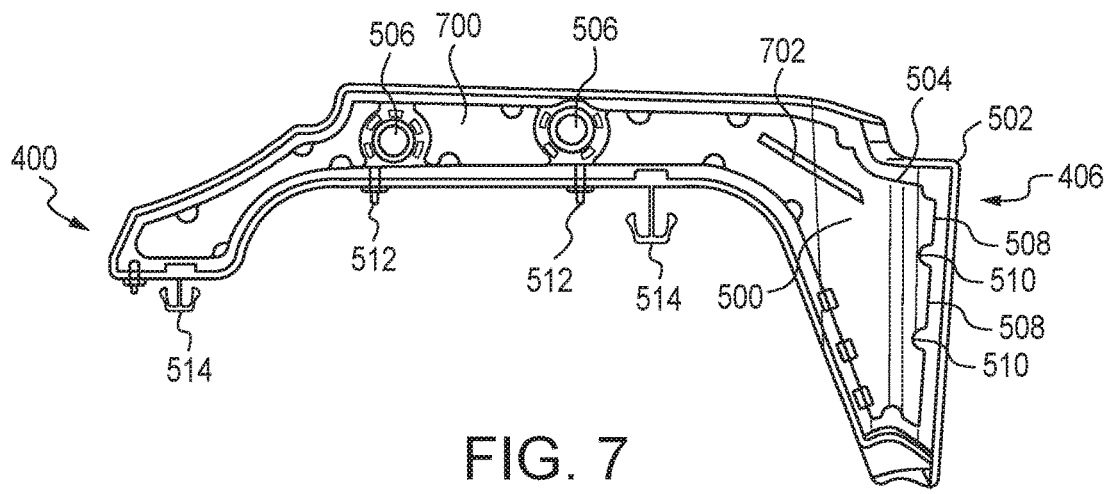
FIG. 7 is a bottom view of the first separator.
Figure 8:
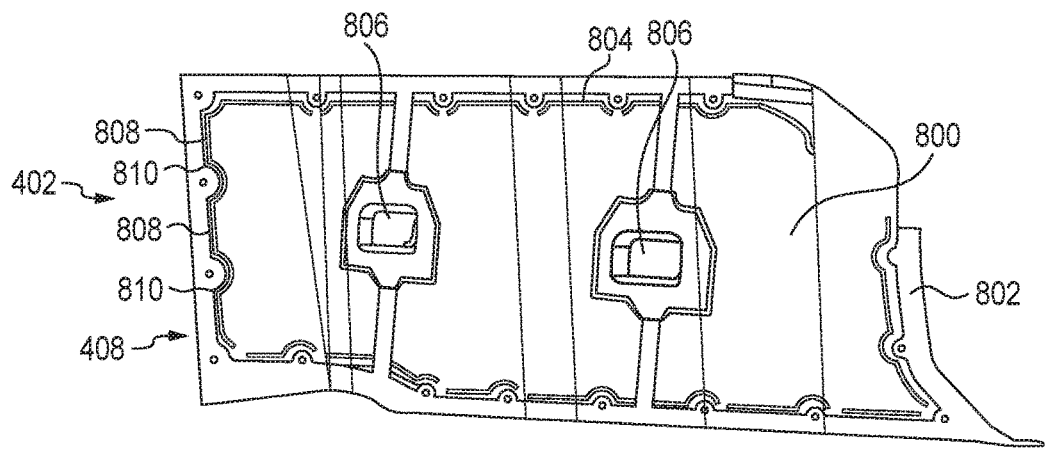
FIG. 8 is a top view of a second separator of the separator package.
Figure 9:
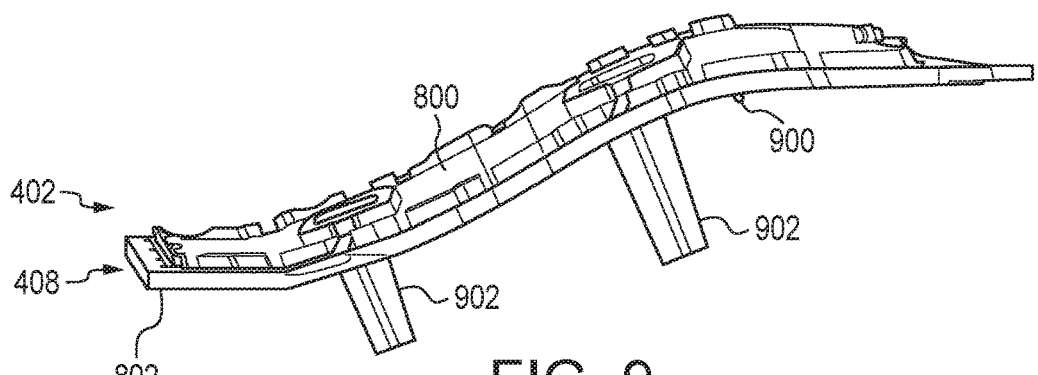
FIG. 9 is a side view of the second separator.
Figure 10:
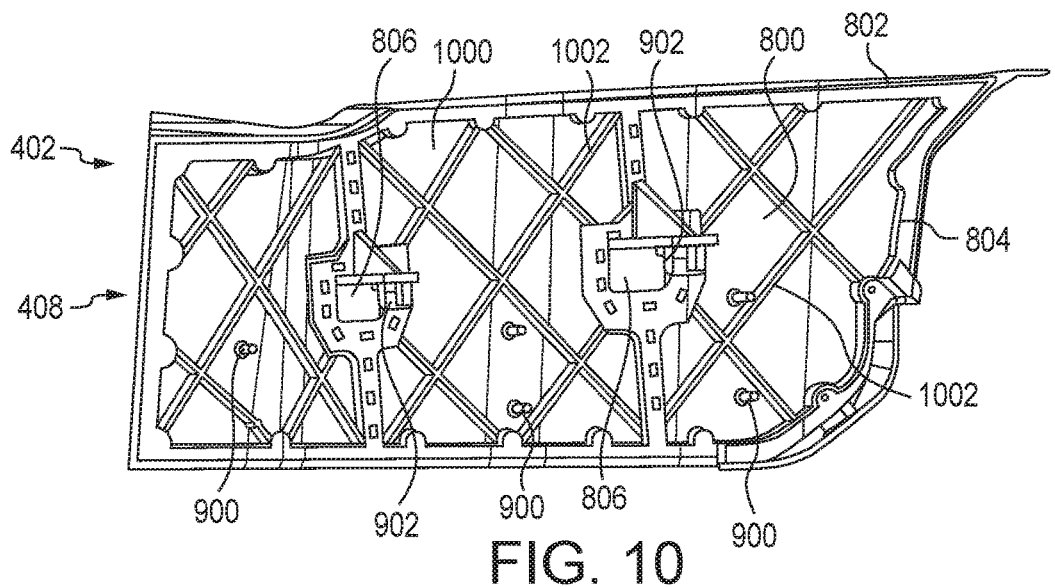
FIG. 10 is a bottom view of the second separator.

The first separator 400, illustrated in FIGS. 5-7, is designed to fill the first portion 214 of the rear quarter cavity portion 202, and the second separator 402, illustrated in FIGS. 8-10, is designed to fill the second portion 216 of the rear quarter cavity portion 202. In turn, the first separator 400 and second separator 402 are designed to fit together, the first separator 400 along a rearward edge 406 and the second separator 402 along a forward edge 408.

The first separator 400 includes a co-injection molded main body 500 and an expandable layer 502 about an outer edge 504 of the main body 500 made of an expandable material. In the embodiment illustrated in FIGS. 5-7, the main body 500 may be made of a plastic having high mechanical strength, rigidity, good stability under heat and/or chemical resistance such as Nylon 66, although any other suitable material known to one skilled the art may be used. The main body 500 may further include drainage holes 506 to allow for drainage of an e-coat solution from the cavity 200 during the manufacturing process. The drainage holes 506 may be lined with the expandable material to allow the drainage holes 506 to seal during the baking and curing process. The expandable layer 502 of the first separator 400, which may be co-injection molded with the main body 500, is made of an expandable heat-cured foaming material that expands under heating during the e-coat curing step of the manufacturing process, such as that sold under the name Terophon® 21107 manufactured by Henkel Corporation, or any other suitable material known to one skilled in the art. In the disclosed embodiment, the expandable material may expand in volume up to approximately 1500% when heated at 160-176° C.

The first separator 400 may also include discontinuous ribs 508 along the outer edge 504 of the main body 500, particularly on the leading rearward edge 406 that faces the second separator 402. The ribs 508 may serve multiple purposes. First, by providing indentations 510 between the ribs 508, the ribs 508 may provide additional drainage for e-coat solution. Additionally, the ribs 508 provide additional surface area on the main body 500 to control expansion of the expandable layer 502 in the e-coat curing and baking process, directing the expandable layer 502 outward to contact the sheet metal of the pillar stiffener 212 and outer side panel 206 to create a seal.

As illustrated in FIG. 7, the underside 700 of the first separator 400 may include structural ribs 702 for added structural stiffness. Further, as illustrated in FIGS. 5 and 7, the first separator 400 may also include stand-off posts 512 to support the first separator 400 as it sits on sheet metal prior to the final baking that completes the curing and sealing of the expandable layer 502.

The first separator 400 may also include offset clips 514 that fasten and secure the first separator 400 to the body 102 prior to the baking process. The first separator 400 may further be attached to a body component, such as the pillar stiffener 212, prior to assembly of the body 102 of the motor vehicle 100.

The second separator 402 is co-injection molded with a main body 800 and an expandable layer 802 along an outer edge 804 of the main body 800 made of the expandable material. In the embodiment illustrated in FIGS. 8-10, the main body 800 may be made of the same material as the first separator 400, a plastic having high mechanical strength, rigidity, good stability under heat and/or chemical resistance such as Nylon 66, although any other suitable material known to one skilled the art may be used. The main body 800 may further include drainage holes 806 to allow for drainage of an e-coat solution from the cavity 200 during the manufacturing process. The drainage holes 806 may be lined with the expandable material to allow the drainage holes 806 to seal during the baking and curing process. The expandable layer 802 of the second separator 402, which may be co-injection molded with the main body 800, is made of the same expandable material as the expandable layer 502 of the first separator 400.

The second separator 402 may also include discontinuous ribs 808 along the outer edge 804 of the main body 800, particularly on the leading forward edge 408 that faces the first separator 400. The ribs 808 may serve multiple purposes. First, by providing indentations 810 between the ribs 808, the ribs 808 may provide additional drainage for e-coat solution. Additionally, the ribs 808 provide additional surface area on the main body 800 to control expansion of the expandable layer 802 in the e-coat curing and baking process, directing the expandable layer 802 outward to contact the sheet metal of the side sill reinforcement 208, wheel arch reinforcement extension 210, and outer side panel 206 to create a seal.

The expandable layers 502, 802 of the rearward edge 406 of the first separator 400 and forward edge 408 of the second separator 402 expand to contact each other during the baking process, joining the first separator 400 and second separator 402 together and creating a seal therebetween.

As illustrated in FIG. 10, the underside 1000 of the second separator 402 may include structural ribs 1002 for added structural stiffness. Further, the second separator 402 may also include stand-off posts 900 to support the second separator 402 as it sits on sheet metal prior to the final baking that completes the curing and sealing of the expandable layer 802.

The second separator 402 may also include offset clips 902 that fasten the second separator 402 to the body 102 prior to the baking process. The second separator 402 may further be attached to a body component, such as the side sill reinforcement 208, prior to assembly of the body 102 of the motor vehicle 100. The first separator 400 and second separator 402 may then be moved into proximity with each other as the pillar stiffener 212 and the side sill reinforcement 208, for example, are assembled together, and the sealing is completed during the baking process. During the baking process, the expandable layers 502, 802 are heated and expand to contact each other and the pillar stiffener 212, side sill reinforcement 208, wheel arch reinforcement extension 210, and outer side panel 206, thereby sealing the cavity 200.

Figure 11:
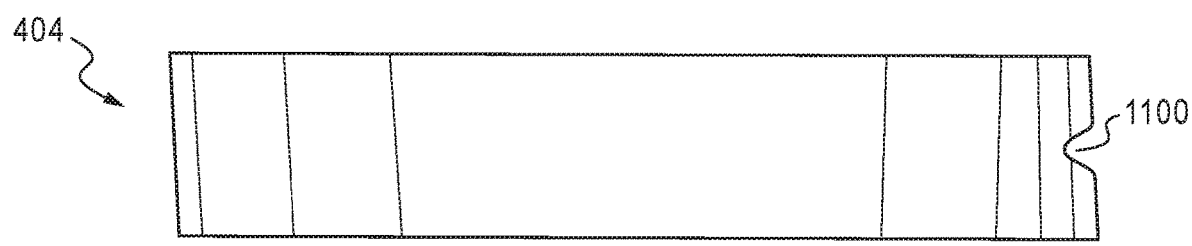
FIG. 11 is a top view of a third separator of the separator package.
Figure 12:
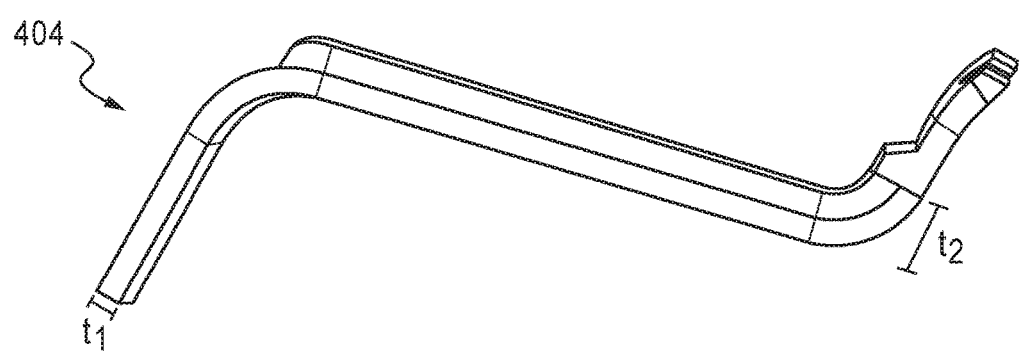
FIG. 12 is a side view of the third separator.

FIGS. 11-12 illustrate an embodiment of the third separator 404 that seals the forward quarter cavity portion 204 of the cavity 200. The third separator 404 is a tape separator made of a second expandable, heat-cured foaming material, such as that sold under the name Terophon® 22000 by Henkel Corporation. The third separator 404 may have variable thickness, such as a thickness $t_1$ in a narrower location 220, and a thicker thickness $t_2$ in a wider location 222, to optimize material use in areas where the cavity 200 widens and narrows as illustrated in FIG. 2. The second expandable material is tacky and adheres to the body 102, and thus may not require any mechanical fasteners. As shown in FIG. 11, the third separator 404 may include a notch 1100 used to identify the proper orientation of the third separator 404 during the assembly process. After assembly, the third separator 404 expands approximately 300% during the e-coat baking and curing process, which seals the forward quarter cavity portion 204. The third separator 404 may be manufactured in an extrusion process to be properly shaped prior to assembly in the motor vehicle 100.

When the motor vehicle 100 is baked and cured after being deposited and removed from an e-coat tank, between 160-176° C., the expandable material of the first separator 400 and second separator 402 and the second expandable material of the third separator 404 expand to complete the sealing of the cavity 200. The expandable material and second expandable material expand to connect with each other and to fill all the drainage holes 506, 806 and rib indentations 510, 810 in the first and second separators 400, 402.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A separator for sealing a cavity in a motor vehicle, comprising:
   a first separator part for sealing a first portion of the cavity, comprising;
      a first expandable layer located around an outer edge of the first separator part; and
   a second separator part for sealing a second portion of the cavity, comprising:
      a second expandable layer located around an outer edge of the second separator part; and
   wherein the first separator part abuts the second separator part when installed in the cavity of the motor vehicle; and
   wherein the first expandable layer and second expandable layer expand to provide a seal around the first separator part and second separator part when heated.

2. The separator of claim 1 wherein the first separator part and the first expandable layer are co-injection molded and the second separator part and the second expandable layer are co-injection molded.

3. The separator of claim 2 wherein the first separator part and the second separator part comprise nylon.

4. The separator of claim 3 wherein first expandable layer and the second expandable layer comprise a heat-curable foaming material.

5. The separator of claim 4 wherein the first expandable layer and the second expandable layer expand when heated between 160-176° C.

6. The separator of claim 1 further comprising:
   a first clip integrally formed with the first separator part for attaching the first separator part to the motor vehicle; and
   a second clip integrally formed with the second separator part for attaching the second separator part to the motor vehicle.

7. The separator of claim 6 wherein the second separator part further comprises a drainage opening.

8. The separator of claim 7 wherein the second separator part further comprises at least one rib to provide stiffness to the second separator part.

9. The separator of claim 1 further comprising:
   a third separator part for sealing a third portion of the cavity, comprising:
      an expandable tape that adheres to a surface of the third portion of the cavity; and
      wherein the expandable tape expands to seal the third portion of the cavity when heated.

10. The separator of claim 9 wherein the third separator part abuts the first separator part when heated.

11. A system for sealing a cavity in a motor vehicle, the cavity being formed by at least a first body part and a second body part, comprising:
    a separator, comprising:
        a first separator part attached to the first body part for sealing a first portion of the cavity, comprising:
            a first expandable layer located around an outer edge of the first separator part; and
        a second separator part attached to the second body part of the motor vehicle for sealing a second portion of the cavity, comprising:
            a second expandable layer located around an outer edge of the second separator part;
    wherein the first separator part abuts the second separator part when installed in the cavity of the motor vehicle; and
    wherein the first expandable layer and second expandable layer expand to provide a seal around the first separator part and second separator part when heated to seal the cavity.

12. The system of claim 11 wherein the first separator part and the first expandable layer are co-injection molded and the second separator part and the second expandable layer are co-injection molded.

13. The system of claim 12 wherein the first separator part and the second separator part comprise nylon.

14. The system of claim 13 wherein first expandable layer and the second expandable layer comprise a heat-curable foaming material.

15. The system of claim 14 further comprising:
    a third separator part for sealing a third portion of the cavity, comprising:
        an expandable tape that adheres to a surface of the third portion of the cavity; and
        wherein the expandable tape expands to seal the third portion of the cavity when heated.

16. The system of claim 15 wherein the third separator part abuts the first separator part when heated.

17. The system of claim 11 wherein the first separator part is attached to the first body part prior to installing the first body part in the motor vehicle.

18. The system of claim 17 wherein the second separator part is attached to the second body part prior to installing the second part in the motor vehicle.

* * * * *